United States Patent [19]

Adamski

[11] Patent Number: 5,418,345
[45] Date of Patent: May 23, 1995

[54] METHOD FOR FORMING SHAPED PASSAGES

[75] Inventor: Edward G. Adamski, Middletown, Conn.

[73] Assignee: United Technologies Corporation, Hartford, Conn.

[21] Appl. No.: 203,071

[22] Filed: Feb. 28, 1994

[51] Int. Cl.⁶ .................... B23H 1/00; B23H 9/10; B23H 9/14; B23K 26/00

[52] U.S. Cl. .................... 219/69.17; 29/564; 219/127.71; 219/121.82; 364/474.04; 364/474.08; 364/474.34

[58] Field of Search .................... 204/129.55, 224 M; 29/564, 56.5, 56.6, 33 P; 219/69.17, 69.2, 69.16, 121.7, 121.71, 121.82; 364/474.34, 474.35, 474.36, 474.04, 474.08; 408/1 R, 13

[56] References Cited

U.S. PATENT DOCUMENTS

| | | | |
|---|---|---|---|
| 3,408,471 | 10/1968 | Shulman | 219/69 |
| 3,538,289 | 11/1970 | Burnet et al. | 219/69 |
| 3,696,504 | 10/1972 | Cupler, II | 29/558 |
| 3,698,834 | 10/1972 | Meginnis | 416/96 |
| 3,700,418 | 10/1972 | Mayeda | 29/180 |
| 3,795,604 | 3/1974 | McKinney et al. | 204/224 |
| 3,816,272 | 6/1974 | Joslin | 202/129.1 |
| 3,934,322 | 1/1976 | Hauser et al. | 29/156.8 |
| 3,981,786 | 9/1976 | Andrews | 204/224 |
| 4,050,507 | 9/1977 | Chu et al. | 165/1 |
| 4,092,515 | 5/1978 | Joslin et al. | 219/121 |
| 4,131,524 | 12/1978 | Gieles | 204/129.3 |
| 4,159,407 | 6/1979 | Wilkinson et al. | 219/69 M |
| 4,197,443 | 4/1980 | Sidenstick | 219/69 E |
| 4,407,632 | 10/1983 | Liang | 416/97 R |
| 4,448,802 | 5/1984 | Buhl et al. | 427/42 |
| 4,583,159 | 4/1986 | Kanemoto et al. | 364/474.34 |
| 4,628,170 | 12/1986 | Furukawa | 219/69 D |
| 4,650,949 | 3/1987 | Field | 219/69 E |
| 4,653,983 | 3/1987 | Vehr | 416/97 R |
| 4,664,597 | 5/1987 | Auxier et al. | 416/97 R |
| 4,672,727 | 6/1987 | Field | 29/156.8 |
| 4,737,613 | 4/1988 | Frye | 219/121 |
| 4,762,464 | 8/1988 | Vertz et al. | 416/97 R |
| 4,794,687 | 1/1989 | Peters et al. | 29/56.6 |
| 4,796,195 | 1/1989 | Haggerty | 364/474.35 |
| 4,808,785 | 2/1989 | Vertz et al. | 219/69 M |
| 4,818,834 | 4/1989 | Rupert | 219/69.17 |
| 4,857,696 | 8/1989 | Taeusch et al. | 219/121.7 |
| 5,027,488 | 7/1991 | Lyerly et al. | 29/33 P |
| 5,084,602 | 1/1992 | Gamo et al. | 219/69.12 |
| 5,246,316 | 9/1993 | Smith | 364/474.37 |
| 5,291,647 | 3/1994 | Fukasawa et al. | 29/564 |

FOREIGN PATENT DOCUMENTS

| | | |
|---|---|---|
| 3544396 | 10/1986 | Germany. |
| 58-135786 | 8/1983 | Japan. |
| 61-222696 | 10/1986 | Japan .................... 219/121.82 |
| 62-152608 | 7/1987 | Japan .................... 408/1 R |
| 0891306 | 12/1981 | Russian Federation. |

*Primary Examiner*—Geoffrey S. Evans

[57] ABSTRACT

A two step operation passage forming process includes steps to minize tolerance build up between the operations. The method includes a step of determining a spatial error between the coordinate systems of the two operations. In a particular embodiment, the step of determining the spatial error includes forming an indexing hole in a template at a particular location using the first operation, aligning the apparatus of the second operation with the indexing hole, and measuring the spatial error between the actual position of the indexing hole and a translated position. The determined spatial error may then be used as an offset in the second operation to account for tolerance differences between the two operations.

14 Claims, 4 Drawing Sheets

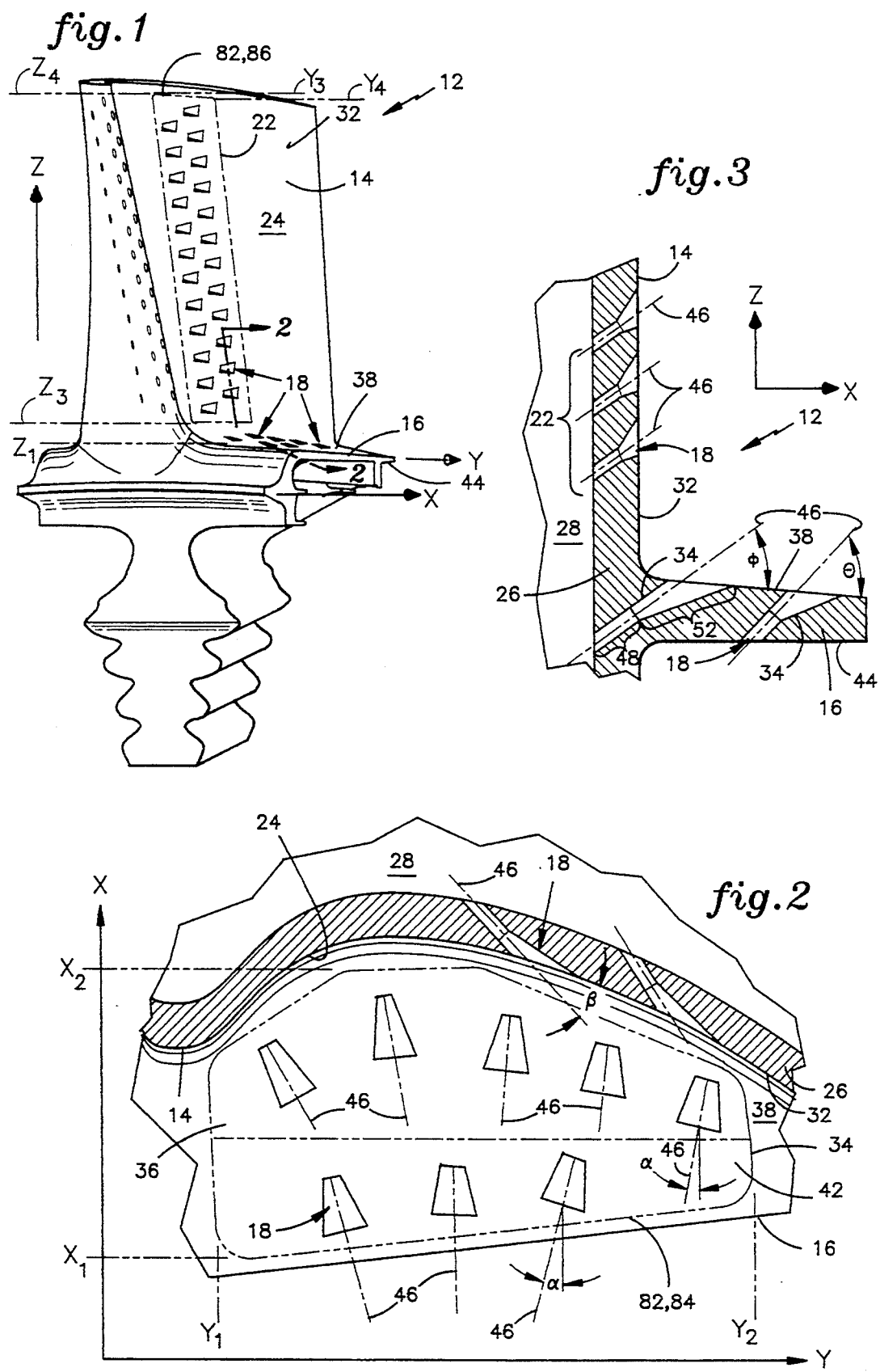

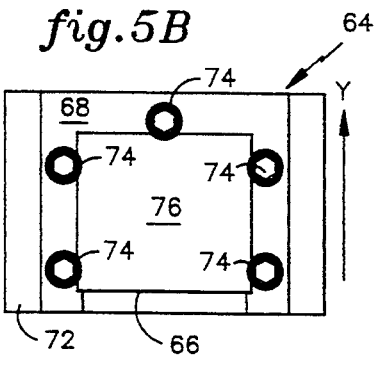
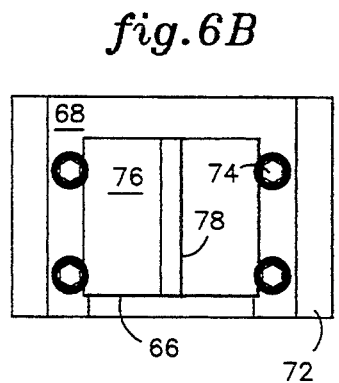
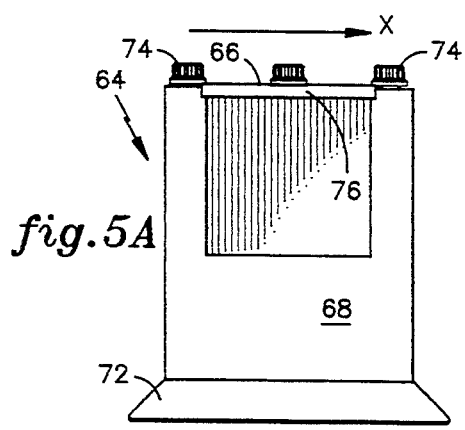
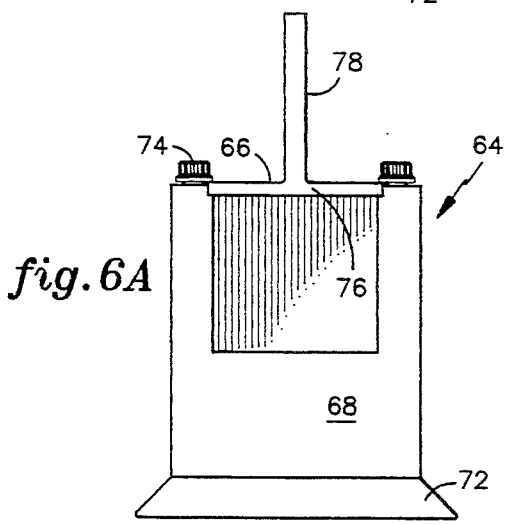
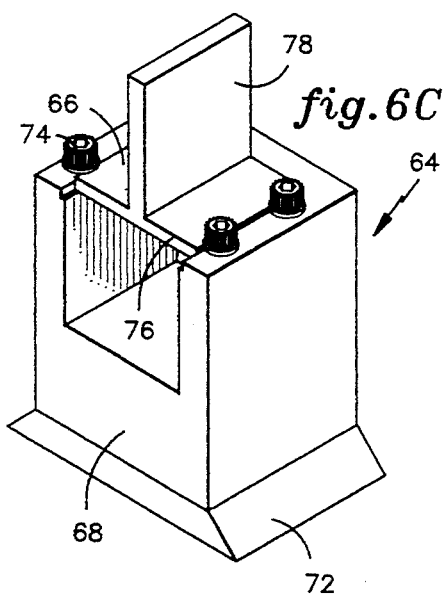
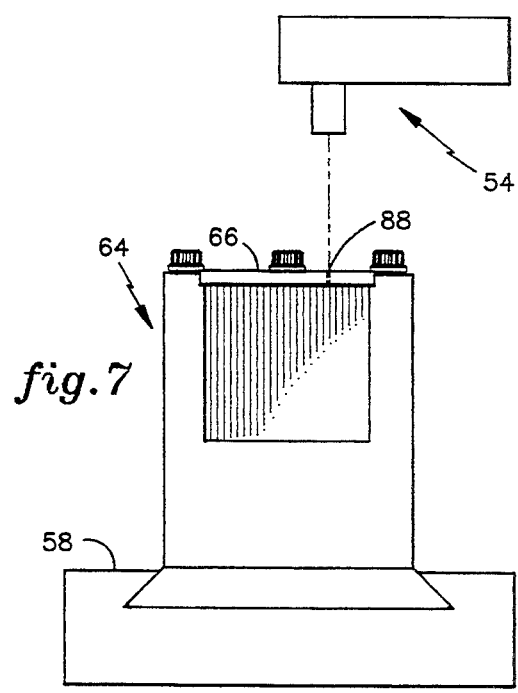

METHOD FOR FORMING SHAPED PASSAGES

TECHNICAL FIELD

This invention relates to methods for forming shaped passages in an article, and more particularly to methods for forming passages having two or more portions, each portion requiring a separate passage forming operation.

Although the invention was developed in the field of gas turbine engines, it has applications in other fields wherein complex shaped passages are formed in articles.

BACKGROUND OF THE INVENTION

Gas turbine engine components, such as rotor blades and vanes, are used in environments having temperatures approaching or exceeding the allowable temperature limits of the materials used in those components. Cooling fluid is flowed through and over the external surfaces of the components to avoid overheating of the components and its inherent structural degradation. In a typical application, cooling air is flowed through the blade or vane and then ejected through passages extending through to the external surface.

To optimize the effectiveness of the cooling, the cooling passages are angled and shaped to produce a film of cooling fluid over the external surface of the component. An example of one such type of cooling passage is disclosed in U.S. Pat. No. 4,653,983, issued to Vehr and entitled "Cross-Flow Film Cooling Passages". As discussed therein, these passages include a metering section and a diffusing section. The metering section controls the amount of cooling fluid flowing through the passage. The diffusing section reduces the velocity of the ejected fluid to encourage the fluid to form a boundary layer of cooling fluid downstream of the passage. In addition, the diffusing section maximizes the amount of external surface area covered by the film of cooling fluid.

Forming shaped cooling passages in materials such as those used in gas turbine engines presents difficulties. One popular method is to form the passages by electric-discharge machining (EDM). Examples of EDM methods of forming shaped holes are disclosed in U.S. Pat. No. 4,197,443, issued to Sidenstick and entitled "Method and Apparatus for Forming Diffused Cooling Holes in an Airfoil", and U.S. Pat. No. 4,650,949, issued to Field and entitled "Electrode for Electrical Discharge Machining Film Cooling Passages in an Airfoil". EDM provides an easy method to form the complex shape of the diffusing portion while also providing the accuracy required for the metering section.

For many applications, a one step EDM method is sufficient to form the shaped passages. However, for passages having excessive length a one step EDM method may not be economically efficient due to the time intensive nature of the process relative to other available processes, such as laser drilling. In U.S. Pat. No. 4,762,462, issued to Vertz et al and entitled "Airfoil with Diffused Cooling Holes and Method and Apparatus for Making the Same", a two step method of laser drilling and EDM forming a shaped passage is disclosed. This method takes advantage of the speed of the laser drilling step to form the typically longer and simpler shaped metering hole. EDM is then used to form the more complex shape of the diffusing hole.

While less time consuming than the single step EDM methods for lengthy passages, the two step method disclosed in Vertz presents the difficulty of accurately aligning the two portions formed by different processes. Improperly aligning the two portions of the shaped passage leads not only to less effective cooling but may also be a source of crack propagation within the article formed. The latter is especially significant in the gas turbine engine field where the components are highly stressed and under intense heat loads. Cracking reduces the useful life of the gas turbine engine component. Taking into consideration the quantity of cooling passages present in the typical turbine component, a single improperly aligned passage may have costly consequences.

The above art notwithstanding, scientists and engineers under the direction of Applicant's Assignee are working to develop inexpensive and accurate methods and apparatus to form shaped passages in articles.

DISCLOSURE OF THE INVENTION

The present invention is predicated in part upon the recognition that a significant cause of misalignment between portions of shaped passages is caused by tolerance summing between the two apparatus used to form the two portions of the passages. The inaccuracy of one passage forming operation adds to the inaccuracy of the other passage forming operation. As a result, the two portions may be detrimentally misaligned even though each portion is within the tolerance of its respective apparatus for performing that operation.

According to the present invention, a method to form a plurality of shaped passages in an article includes a step of determining a spatial error between the coordinate systems of the two passage forming means within an envelope defined by the location of the plurality of passages. In particular, the method includes the steps of forming an indexing hole at a specified position in a template using the first passage forming means, placing the template within the second passage forming means and aligning the second passage forming means with the indexing hole, and determining the spatial error between the actual position of the indexing hole and the programmed position of the indexing hole relative to the second passage forming means. The spatial error is then accounted for prior to forming the portions of the passages using the second passage forming means.

In a particular embodiment of the present invention, the first portions are formed by laser drilling and the second portions are formed by electric discharge machining (EDM). The indexing hole is laser drilled in the template at a location corresponding to the location of one of the plurality of shaped passages to be formed in the article. The template is then paced within the EDM apparatus and an electrode is aligned with the laser drilled indexing hole. The difference between the measured position of the laser drilled indexing hole and the programmed position of the particular passage generates an off-set value. The off-set value is then added to the programmed positions of all of the plurality of passages within the particular envelope defined by the plurality of passages.

For articles having spatially separated groups of passages, a separate envelope may be defined for each group. An indexing hole is selected for each envelope to generate a separate off-set for each envelope.

A principle feature of the present invention is the step of forming an indexing hole in a template within a spatial envelope. This step provides means to account for tolerance differences between two separate operations. As a result, the misalignment between the two portions is minimized.

Although developed in the field of aircraft engines, it should be apparent to those skilled in the art that the invention disclosed herein has applications in other fields. In particular, the invention has application to any article having a passage of complex shape formed therein and which requires multiple operations to form the passage.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 1 is a perspective view of a gas turbine engine rotor blade having an airfoil portion with shaped cooling passages and a platform with shaped cooling passages.

FIG. 2 is a sectioned view of the rotor blade taken along line 2—2 of FIG. 1, showing the passage axis for each cooling passage.

FIG. 3 is a top view of the rotor blade showing the alignment of the cooling passages in the platform portion.

FIGS. 5a and 5b are front and top views of a platform template secured within a fixture.

FIGS. 6a, b and c are front, top and perspective views, respectively, of an airfoil template within a fixture.

FIG. 7 is an illustrative view of the fixture and platform template within a passage forming apparatus.

BEST MODE FOR CARRYING OUT THE INVENTION

Figure 4A:
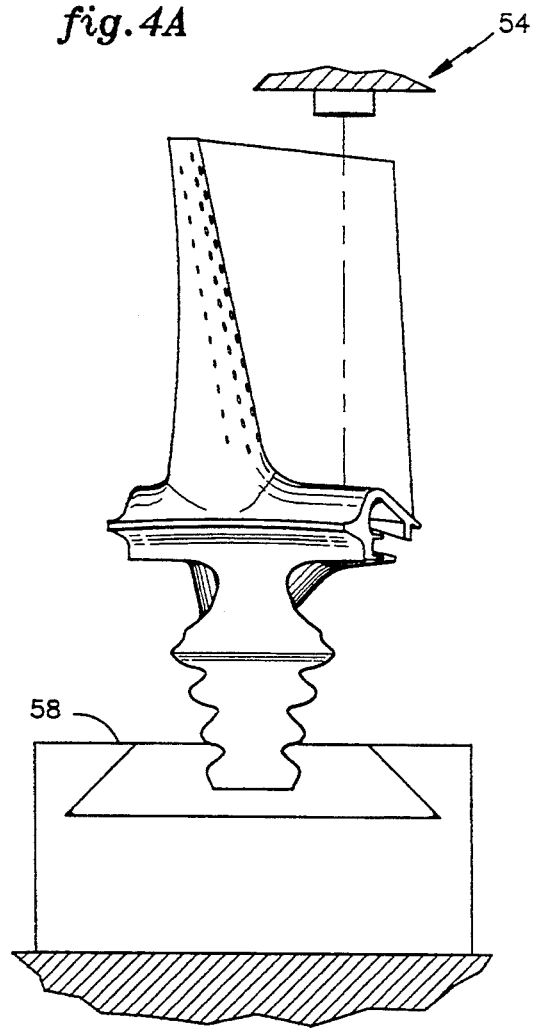
FIG. 4a and 4b are illustrative views of the rotor blade within a laser drilling apparatus and an electric discharge machining apparatus, respectively.

FIG. 1 illustrates an article having shaped passages. As shown in FIG. 1, the article is a gas turbine engine rotor blade 12 having an airfoil 14, a platform 16, and multiple shaped cooling passages 18.

The airfoil 14 includes a plurality of shaped cooling passages 22 disposed along the pressure side 24 of the airfoil 14. As shown in FIG. 2, the plurality of cooling passages 22 extend through the wall 26 of the airfoil 14 and provide flow communication between the hollow core 28 of the airfoil 14 and the external surface 32 of the airfoil 14. Cooling fluid exiting the plurality of cooling passages 22 forms a film or buffer of cooling fluid flowing over the external surface 32 downstream of the plurality of cooling passages. This film of cooling fluid insulates the external surface 32 of the airfoil 14 from the hot gases flowing through the gas turbine engine.

The platform 16 includes another plurality of cooling passages 34 extending through the platform 16. A first group of the cooling passages 36 are adjacent to the airfoil 14. As shown in FIG. 3, this group of cooling passages 36 extend from the hollow core 28 to the flow surface 38 of the platform 16 to provide flow communication between the core 28 and the flow surface 38 of the platform 16. A second group of cooling passages 42 are spaced laterally from the airfoil 14. This group of cooling passages 42 extend through the platform 16 to provide flow communication between the underside 44 of the platform 16 and the flow surface 38 of the platform 16. The two groups of cooling passages 36,42 in conjunction generate a film of cooling fluid flowing over the flow surface 38 of the platform 16.

Each cooling passage 18 is disposed about a passage axis 46 and includes a metering section 48 and a diffusing section 52. The metering section 48 is centered on the passage axis 46 and is of constant diameter. The metering section 48 controls the amount of cooling fluid flowing through the cooling passage 18. The diffusing section 52 expands outwardly such that the velocity of the cooling fluid flowing through the metering section 48 decreases and the body of fluid spreads over a greater area. The shape of each particular cooling passage 18 is typical of those known in the art.

Each cooling passage 18 is canted at a particular angle relative to the flow surface over which it is directing cooling fluid. For the airfoil cooling passages 22, these angles are represented by the character $\beta$ and are shown as being approximately equal to each other. For the platform cooling passages 34, these angles are represented by the character $\phi$. The angles are different depending upon the location of the platform cooling passage 34. In addition, each of the platform cooling passages 34 form an angle $\alpha$ with a common reference, as shown in FIG. 3. The specific orientation of each of the cooling passages 18, whether in the airfoil 14 or the platform 16, is significant to the capabilities of the cooling passages 18 to generate the necessary film of cooling fluid over the flow surfaces of the blade 12.

Forming the shaped cooling passages 18 requires two independent passage forming operations, one for the metering section 48 and one for the diffusing section 52 of each cooling passage 18. For illustrative purposes, a laser drilling operation and an EDM operation will be shown and described as the methods for forming the metering section 48 and the diffusing section 52, respectively. Laser drilling is a time and cost efficient method to make the straight, constant diameter passages for the metering section 48. EDM is a typical method for making passages having three-dimensionally complex shapes, such as the diffusing section 52. Other methods and/or combinations of methods may be use to form the portions of the cooling passages 18 as necessary or convenient.

Figure 4B:
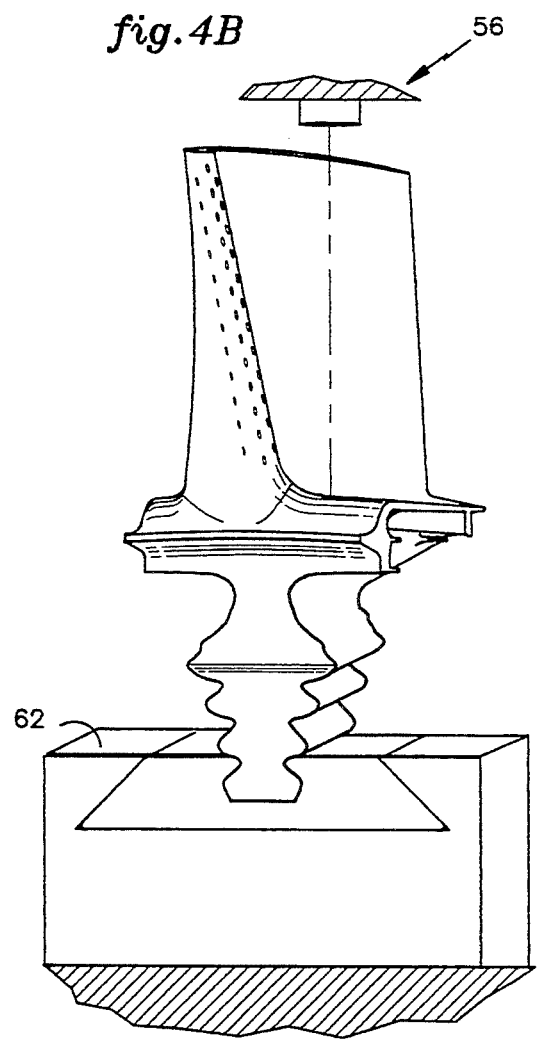
Figure 8:
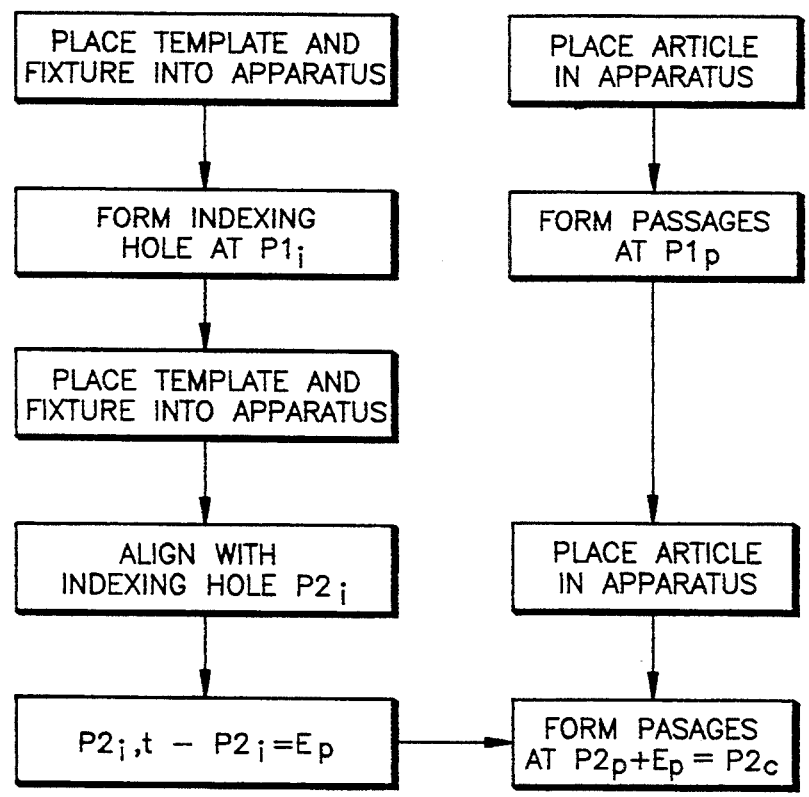
FIG. 8 is a schematic diagram illustrating the steps in the process of forming shaped passages in an article.

As is known in the prior art and as is illustrated in FIGS. 4a and 4b, the rotor blade 12 is first positioned within the laser drilling apparatus 54 and secured onto a multi-axis mount 58. The mount permits the rotor blade 12 to be moved and rotated into the proper position for the laser drilling operation. The location of each of the cooling passages 18 is programmed into the laser drilling apparatus 54 in accordance with the device's internal coordinate system, i.e. each cooling passage 18 has its own position $Pl_p$. The mount 58 and rotor blade 12 are repositioned by the moving or rotating the mount 58 such that each cooling passage 18 is formed in the proper position, within the tolerances of the device.

Upon completion of the laser drilling of the metering sections 48, the rotor blade 12 is removed from the laser drilling apparatus 54. Laser backing material, used conventionally to prevent back wall strikes during laser drilling, is removed from the rotor blade 12. The rotor blade 12 is then placed within the EDM apparatus 56. Again, a multiaxis mount 62 is used to position and rotate the rotor blade 12 into the proper orientation for the EDM passage forming. As with the laser drilling device, the EDM apparatus 56 has its own internal coordinate system and each cooling passage 18 has a spatial position $P2_p$ within that coordinate system. The diffusing sections 52 are formed at the specified locations, again within the tolerances of the EDM apparatus 56.

In order to simplify this description, the coordinate system of the laser drilling apparatus 54 and the EDM apparatus 56 are assumed to be similar. The coordinate system is represented on FIGS. 1-3 as having an X, Y and Z axis. For clarity proposes, positions within the coordinate system of the first passage forming apparatus will be represented by P 1 and positions within the coordinate system of the second passage forming apparatus will be represented by P2.

Tolerance build-up may occur as a result of using the two independent operations to form the cooling passages 18. This may be especially significant if the totality of cooling passages 18 are spread out over a range of locations and have a wide range of orientations. Such a condition will require the mounts 58,62 to make considerable rotations and movements to properly position the rotor blade 12 for each passage forming operation. The greater the movement of the mounts 58,62, the greater the range of tolerances for each passage forming apparatus. For the rotor blade 12 illustrated in FIGS. 1 to 3, there is a significant spatial separation between the platform cooling passages 34 and the airfoil cooling passages 22. In addition, within the two groups of platform cooling passages 36,42 there is a range of angles relative to the flow surface 38 of the platform 16 and the reference coordinate system. The range of angles and spatial positions may lead to misalignments of the metering sections 48 and the diffusing sections 52.

In accordance with Applicant's invention, a method to reduce the tolerance build-up and the likelihood of significant misalignment involves the use of an additional fixture 64 and a template 66, such as that shown in FIGS. 5 to 7. The fixture 64 includes a frame 68, a dovetail shaped base 72, and a plurality of retainers 74. The dovetail base 72 is adapted to permit the frame 68 to be secured within the multi-axis mounts 58, 62. The template 66 includes a flat plate 76 sized appropriately to fit within the plurality of retainers 74 such that the template 66 may be secured to the fixture 64.

For the platform cooling passages 34, the template 66 shown in FIGS. 5a and 5b may be used; for the airfoil cooling passages 22, the template 66 shown in FIG. 6a, b and c may be used. The embodiment of FIG. 6a, b and c includes an upright portion 78 disposed on the flat plate 76 to simulate the airfoil 14.

A spatial envelope 82 is defined for each set of cooling passages 18 to be formed. For the rotor blade 12 shown in FIG. 1, the platform cooling passages 34 define one envelope 84 and the airfoil cooling passages 22 define a second envelope 86. The platform cooling passages 34 define a first envelope 84 having height $Z_1$ (see FIG. 4a), X coordinates between X1 and X2 and Y coordinates between Y1 and Y2 (see FIG. 1). The airfoil cooling passages 22 define a second envelope 86 having an X coordinate X3, Y coordinates between Y3 and Y4 and Z coordinates between Z3 and Z4.

Prior to performing the second passage forming operation for the platform cooling passages 34, the fixture 64 and template 66 are positioned within the first passage forming apparatus (see FIG. 7). An indexing hole 88 is formed in the template 66 at a position $P1_i$ within the envelope 84 of the platform cooling passages 34. A position within the envelope 84 is chosen to minimize tolerance differences between the indexing hole 88 and the spatial position of each of the platform cooling passages 34. Preferably, the position of one of the platform cooling passages 34 is selected as the position of the indexing hole 88. It is suggested that a platform cooling passage 34 centrally located within the envelope and having angles and with values in the middle of the range of angles be selected. Such a selection will minimize the location and orientation differences between the indexing hole 88 and the rest of the platform cooling passages 34 to thereby minimize the tolerances.

After the indexing hole 88 is formed, the fixture 64 and template 66 is moved to the second passage forming apparatus and secured to the mount 62. The second passage forming apparatus is aligned with the indexing hole 88 and the position $P2_i$ of the indexing hole 88 relative to the coordinate system of the second passage forming means is noted. This position $P2_i$ is compared to the position $P2_t$, which is position $P1_i$ translated from the first coordinate system into the second coordinate system.

Figure 9:
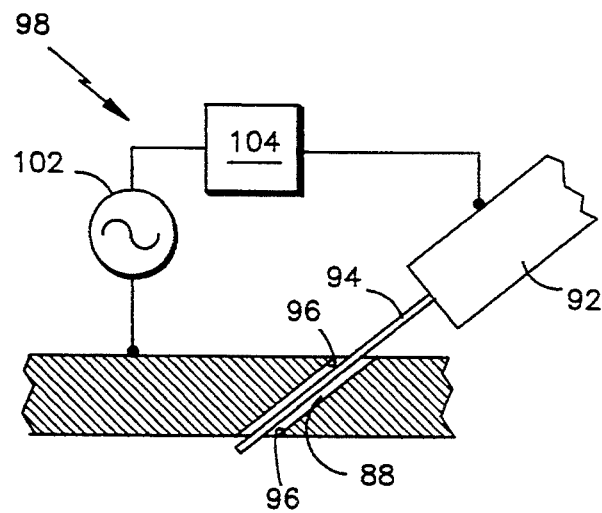
FIG. 9 is an electrode having an extension for aligning the EDM apparatus with the indexing hole and a diagram of an electrical continuity circuit for determining alignment of the EDM apparatus with the indexing hole.

The step of aligning the second passage forming apparatus with the indexing hole 88 may be performed in a number of ways. If the second passage forming apparatus is the EDM apparatus 56 of FIG. 5b, an electrode 92 having an extension 94 as shown in FIG. 9 may be used. The extension 94 is sized to have a diameter smaller than the diameter of the indexing hole 88. If aligned properly, the extension 94 may be placed within the indexing hole 88 without touching the surfaces 96 of the indexing hole 88. To ensure there is no contact between the electrode 92 and the surface of the indexing hole 88, an electrical continuity test may be used. The continuity test would comprise an open electrical circuit 98 between the electrode 92 and the template 66, with a power source 102, such as a battery, and a signaling device 104 responsive to a closed circuit, such as a light. Any contact between the electrode 92 and the surface of the indexing hole 88 will result in the circuit being closed and the light being energized.

The difference resulting from the comparison of the actual position $P2_i$ of the indexing hole 88 and the translated position $P2_{i,t}$ is the spatial error $E_p$. This error $E_p$ is added to the positions $P2_p$ for each of the platform cooling passages 34 to produce corrected positions $P2_c$. In this way, differences between the actual locations $P1_p$ of the metering sections 48 formed by the first passage forming means and the programmed positions $P2_p$ of the diffusing sections 52 of the same cooling passages is corrected for.

For the airfoil cooling passages 22, the steps are similar to the method described above with respect to the platform cooling passages 34. The fixture 64 of FIGS. 6a, b and c is used. It should be noted that for a typical passage forming apparatus, passages such as those shown for the air foil 14 will require the rotor blade 12 to be rotated onto its side. This step of rotating the rotor blade 12, which will usually be required for both of the passage forming apparatus, may lead to additional tolerance build-up between the operations. This additional tolerance build-up amplifies the need for multiple envelopes for spatially separated and differently oriented groups of passages.

Once the fixture 64 is rotated onto its side, the steps of selecting a position for and forming the indexing hole 88, aligning the indexing hole 88 with the second passage forming apparatus, and correcting for the error between programmed positions remain the same.

Although the invention has been shown and described with respect to exemplary embodiments thereof, it should be understood by those skilled in the art that various changes, omissions, and additions may be made thereto, without departing from the spirit and scope of the invention.

What is claimed is:

1. A method to form a plurality of passages in an article, each of the plurality of passages having a first portion and a second portion in flow communication, the first portion formed by a first passage forming means having a first coordinate system, the second portion formed by a second passage forming means having a second coordinate system, each of the plurality of passages having a predetermined spatial position defining a position $P1_p$ within the first coordinate system, a position $P2_p$ within the second coordinate system, and wherein the plurality of passages define a spatial envelope, the method including the steps of:

forming an indexing hole in a plate, the indexing hole being formed by the first passage forming means and at a position $P1_i$ within the first coordinate system, the position $P1_i$ being within the spatial envelope of the plurality of passages;

placing the plate within the second passage forming means and aligning the second passage forming means with the indexing hole;

determining the spatial error $E_p$ between the actual position $P2_i$ of the indexing hole relative to a position $P2_{i,t}$, wherein $P2_{i,t}$ corresponds to a translation of the coordinate $P1_i$ from the first coordinate system into the second coordinate system;

forming the first portions at the positions $P1_p$ using the first passage forming means; and forming the second portions at positions $P2_c$ using the second passage forming means, wherein the positions $P2_c$ correspond to positions $P2_p + E_p$.

2. The method according to claim 1, wherein the first passage forming means is laser apparatus and the second passage forming means is an electric discharge machining apparatus, wherein the step of forming the first portions includes laser drilling the first portions, and wherein the step of forming the second portions includes electric discharge machining the second portions.

3. The method according to claim 1, wherein the first passage forming means is electric discharge machining apparatus and the second passage forming means is an electric discharge machining apparatus, wherein the step of forming the first portions includes electric discharge machining the first portions, and wherein the step of forming the second portions includes electric discharge machining the second portions.

4. The method according to claim 1, wherein the plurality of passages define multiple envelopes, and wherein the step of forming an index hole includes forming a plurality of index holes, at least one within each spatial envelope.

5. The method according to claim 1, wherein the step of forming the indexing hole includes selecting a position for the indexing hole that corresponds to the position of one of the plurality of passages.

6. The method according to claim 1, wherein the second passage forming means includes an electrical circuit extending between the second passage forming means and the template, the electrical circuit having a power source and a signaling device, wherein the step of determining the spatial error $E_p$ includes performing a continuity test to determine accurate location of index hole within second coordinate system.

7. The method according to claim 1, wherein the second passage forming means is an electric discharge machining apparatus and includes an electrode having an extension sized to fit within the indexing hole, and wherein the step of determining the spatial error $E_p$ includes a step of inserting the extension within the indexing hole such that the extension does not touch the surface of the indexing hole.

8. The method according to claim 1, wherein the article is a turbine component and the passages are cooling passages, and wherein the step of forming the first portion includes a step of forming a cooling passage within the turbine component.

9. The method according to claim 8, wherein the turbine component includes an airfoil portion, and wherein the step of forming a first portion includes the step of forming a cooling passage that extends through the airfoil portion.

10. The method according to claim 8, wherein the turbine component includes a platform, and wherein the step of forming a first portion includes the step of forming a cooling passage that extends through the platform.

11. The method according to claim 1, wherein the passages are shaped passages having a metering section and a diffusing section, wherein the step of forming the first portion includes a step of forming the metering section, and wherein the step of forming the second section includes the step of forming the diffusing section.

12. The method according to claim 8, wherein the cooling passages are shaped passages having a metering section and a diffusing section, wherein the step of forming the first portion includes a step of forming the metering section, and wherein the step of forming the second section includes the step of forming the diffusing section.

13. The method according to claim 6, wherein the plurality of passages have a planar position with a range of values and an angle with a range of values relative to a predetermined reference, and wherein the step of forming an indexing hole includes selecting a passage having an angle that is the median of the range of values of the angle.

14. The method according to claim 6, wherein the plurality of passages have a planar position with a range of values and an angle with a range of values relative to a predetermined reference, and wherein the step of forming an indexing hole includes selecting a passage having a planar position that is the median of the range of planar positions.

* * * * *